United States Patent [19]

Wunsche

[11] 4,030,233

[45] June 21, 1977

[54] COCKROACH TRAP

[76] Inventor: Anton E. Wunsche, 656 W. 162nd St., New York, N.Y. 10032

[22] Filed: Dec. 12, 1975

[21] Appl. No.: 640,386

[52] U.S. Cl. .............................................. 43/121
[51] Int. Cl.² ......................................... A01M 1/10
[58] Field of Search ............................ 43/121, 122

[56] References Cited

UNITED STATES PATENTS

| 918,523 | 4/1909 | Fly | 43/121 |
|---|---|---|---|
| 1,024,767 | 4/1912 | Dempster | 43/121 |
| 1,497,800 | 6/1924 | Smith | 43/122 |
| 1,700,517 | 1/1929 | Ross | 43/121 X |
| 3,851,417 | 12/1974 | Wunsche | 43/121 |

*Primary Examiner*—G.E. McNeill
*Assistant Examiner*—Daniel J. Leach
*Attorney, Agent, or Firm*—Michael J. Striker

[57] ABSTRACT

A trap for crawling insects, such as cockroaches, comprises a container with a detachable lid having an opening large enough to admit an insect, this opening giving access to a supply of bait on the container bottom. A downward extension of the lid adjacent its opening, such as a collar surrounding that opening, terminates high enough above the bottom to allow the insect to drop down onto the bait but not to return to the opening by the same path. The inner peripheral wall of the container is coated with a slippery film, preventing the insect from climbing that wall. The bait may be contained in a cup-shaped receptacle on the container bottom.

9 Claims, 6 Drawing Figures

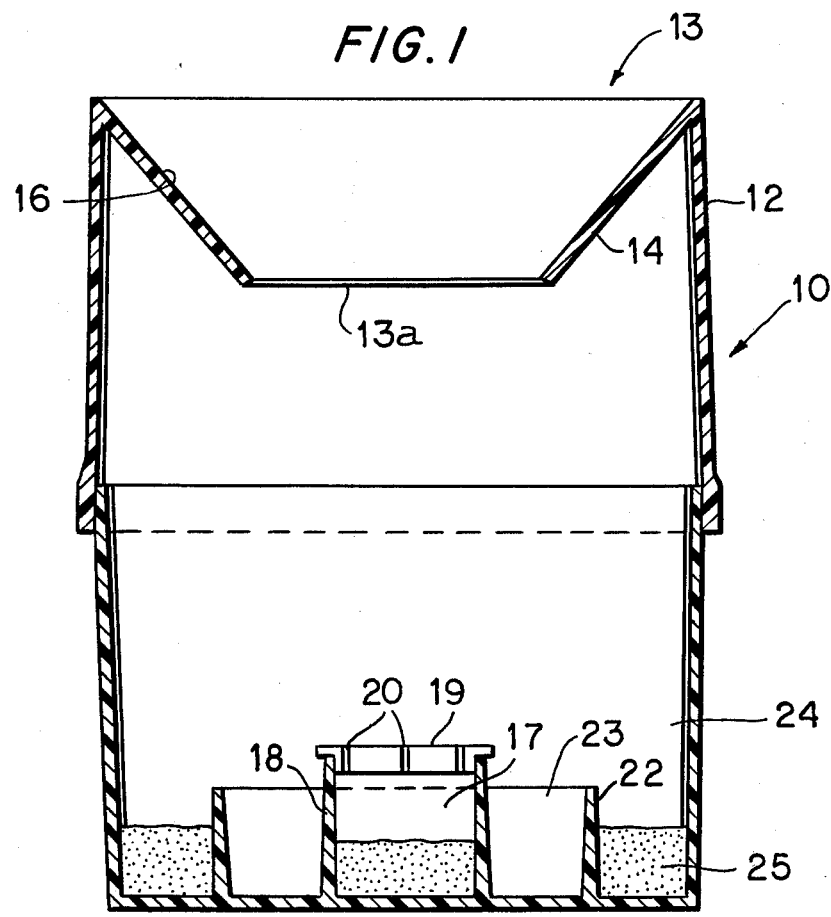
FIG.1
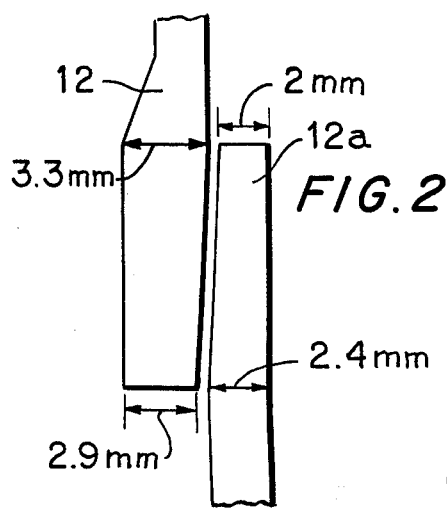
FIG.2
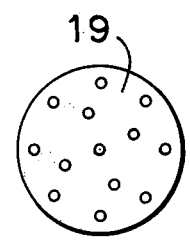
FIG.3
FIG.3A

COCKROACH TRAP

BACKGROUND OF THE INVENTION

My present invention relates to a trap for crawling insects, particularly for cockroaches.

Cockroaches, which tend to infest dwellings as well as commercial establishments such as restaurants, are considered highly resourceful in avoiding all kinds of traps set for them. They are, on the other hand, known to take chances in order to get at supplies of food, despite their limited ability to move through the air by jumping or flying. Because of these highly developed instincts, attempts to lure them to their death with poisoned foodstuff have largely proved futile.

SUMMARY OF THE INVENTION

It is a general object of my present invention to provide a trap for cockroaches and similar vermin which is of simple construction and reliable in operation.

A more particular object is to provide a cockroach trap which does not contain any substances that could be harmful to humans (including children) coming into contact therewith, i.e. is non-poisonous.

A related object is to provide means in such a trap for facilitating the removal of its contents and its subsequent reuse.

I have found, in accordance with the present invention, that an efficient trap for crawling insects — especially cockroaches — can be constructed from an upright container with a closed bottom, adapted to hold a supply of bait, and with a top, advantageously in the form of a removable lid, having an aperture spaced from its rim to give access to its interior. This top may be provided with a downward extension which adjoins that aperture and forms a guidepath leading toward the supply of bait but terminating sufficiently short of the container bottom to prevent an insect attracted by the bait from regaining that extension after landing on the bottom. The inner peripheral wall of the container, which would normally constitute a return path for the insect to the apertured top, is provided with a slippery coating to frustrate the insect's attempts to climb that wall.

Cockroaches come in various sizes ranging in body length from about 15 mm. for the so-called "German cockroach" to approximately 50 mm. for the species known as "American cockroach." The height of the container should be sufficient to make the distance from the lower edge of the guidepath to the highest point of the container bottom substantially greater than the length of the insect's body as measured from its stretched hind legs to the tips of its antennae, preferably on the order of twice that length.

This highest point of the container bottom may be the peak of a pile of bait or the rim of a receptacle holding the bait. In an advantageous embodiment such a receptacle is removably seated on the container bottom.

According to a more particular feature of my invention, the aforementioned downward extension of the container top has the shape of a tubular or of a funnel-shaped collar surrounding the entrance aperture. The height of this collar should be sufficient to let the cockroach get a foothold therein allowing it to explore the interior of the container with its antennae so that the bait will exert a strong attraction on the insect; this will cause the cockroach to let go and to drop onto the bait directly below the entrance aperture, particularly if there are other cockroaches crowding through that aperture and pushing the one in front.

In order to reduce the consumption of bait, and to simplify the emptying of the container, I prefer to limit the width of the bait receptacle to a fraction of the inner container diameter and to subdivide the intervening space into two annular regions by means of a partition wall. At least one of these regions accommodates a ring of foam plastic which is moistened with water by the user. The water keeps the insects alive in the trap until the same is emptied, thus avoiding the smell of decomposing insects if the trap is left alone for several days.

The slippery film coating the inner container wall is advantageously of soap and/or fatty substances. Upon removal of the lid to dump the entrapped insects and to permit extraction of the bait holder for refilling, the coating may be reapplied to the extent necessary.

The container or at least its top may be made of transparent material (glass or plastic) to permit visual inspection of its interior.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a vertical section through my novel trap;

FIG. 2 is a fragmentary section showing an enlarged detail of FIG. 1;

FIG. 3 is a top-plan view of a component of FIG. 1 and

FIG. 3A is a side view of that component;

DESCRIPTION OF THE PREFERRED EMBODIMENTS

Figure 4:
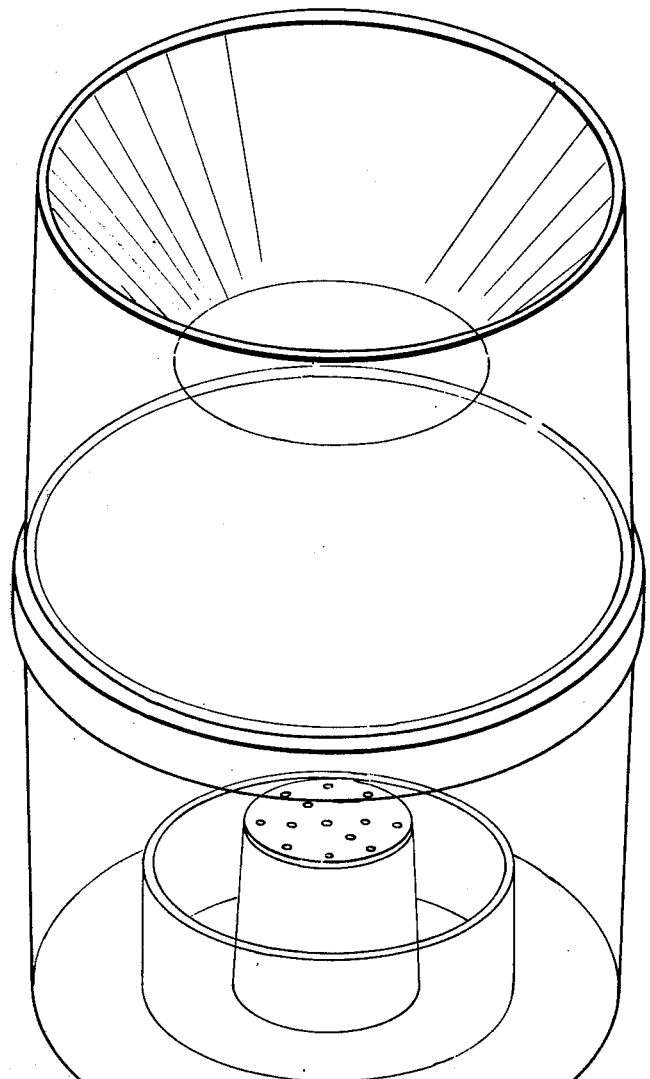
FIG. 4 is a perspective view of the trap in FIG. 1.

The cockroach trap shown in FIGS. 1–4 comprises a cylindrical, upwardly open container 10 of transparent plastic sheet material, such as polystyrene, provided with a detachable lid 12 of similar material having a central aperture 13 framed by an integral collar 14 which forms a downward extension of the lid and in the present case is funnel-shaped. The inner surface of the peripheral wall of the container and of the collar 14 are both lined with a coating 16 of slippery material, such as the aforementioned mixture.

The diameter of outlet aperture 13a is a fraction of the diameter of the entrance aperture 13. A cockroach attracted by the bait will explore the interior of the container while hanging down by its hind legs from the lower rim of collar 14. In most instances, either by its own volition or under pressure from other cockroaches, it will then drop down onto the pile of bait 15 from which it will no longer be able to reach the collar 14. Any attempts to climb the container wall will be frustrated by the slippery coating 16 thereof.

Naturally, the entrance aperture 13 should be wide enough to admit cockroaches of the species to be trapped.

The container bottom is formed with a central boss 18 of slightly frustoconical configuration forming a receptacle 17 designed as a bait holder. The charge of bait 15 in receptacle 17 is exposed at the top to attract the cockroaches; however, to prevent access of the insects to the bait 15, the boss 18 is provided with a cover 19 (see also FIGS. 3 and 3A) having a plurality of holes 20 through which the bait 15 may be sniffed. Holes 20, are, however, too small to permit any but the smallest of the insects from passing through them. The upper edge of boss 18 is formed with a step, and the edge of cover 19 is formed with a corresponding step 21 so that it can be snapped onto the boss 18 and be frictionally held thereon. Lid 12 and cover 19 may be lifted off and (after the dumping of the entrapped insects) the receptacle 17 may be refilled.

The bait may be an ingestible mixture of conventional composition and may include flavoring or scenting.

The bottom wall of receptacle 10 is also formed with an annular ring 22 subdividing the space between the outer wall and the boss 18 into two annular compartments 23 and 24. At least one of these, preferably compartment 24, accommodates a ring 25 of foam-plastic material. A user wets the ring 25 so that the trapped insects will not die from lack of water until the trap is emptied, even if emptying should be delayed for some days. This avoids decomposition of the insects, the attendant odor and their sticking to the trap surfaces. As compared to the case of a pool of water in the compartments 23 and 24, the use of ring 25 has the advantage that the insects will have moisture but cannot drown (and decompose).

FIG. 2 shows a detail of how the lid 12 is placed onto the bottom 12a of the container. The upper edge of the bottom 12a is formed with an upward taper and the lower edge of lid 12 is formed with a corresponding taper so they can engage one another with a friction fit.

It is clear that the receptacle 10 can be made not only of synthetic plastic, but of other materials, such as, for example, cardboard, glass, metal or the like. Its shape need not be cylindrical, but can also be square, oblong, elliptical, in form of a rounded ellipse, or it can have any other desired shape. Instead of making lid 12 removable, it could be of one piece with bottom 12a, and the bait-containing boss 18 could be accessible for refilling through a closable opening in the side wall of the receptacle 10. The boss 18 for the bait 15 need not be integral with the bottom wall; the bait could be in a separate container. This container or the boss 18, could be located elsewhere on the bottom wall than illustrated in the drawing. The collar 14 might be omitted and the lid 12 might simply be provided with the aperture 13. The shape of the aperture 13, whether it is used with or without collar 14, need not be round, but could be oval, square, rectangular, or have any other desired shape. It is also conceivable to use more than one aperture 13, each with or without a collar 14.

Figure 5:
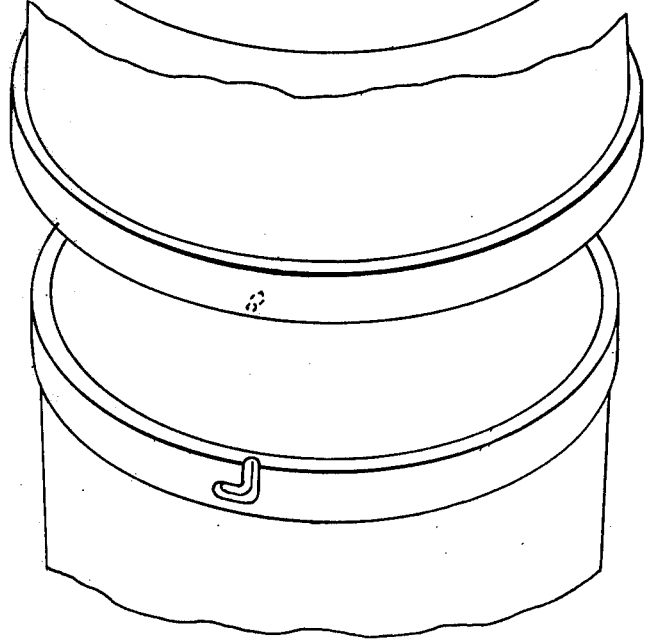
FIG. 5 is a fragmentary exploded view, showing details of a slightly different trap.

FIG. 5, which is otherwise self-explanatory, shows that instead of having a friction-fit connection as in FIG. 1, the lid and the bottom can also be connected by means of bayonet-closures (one shown) provided on their cooperating rims.

I claim:

1. A trap for crawling insects, comprising an upright container adapted to hold a supply of bait and provided with a lid having an aperture and with a bottom part having a bottom wall formed with an annular upstanding partition which defines in said container an inner and an outer compartment, said lid being provided with a downward extension adjoining said aperture and forming a guidepath leading toward said supply of bait but terminating sufficiently short of said bottom wall to prevent an insect attracted by the bait from regaining said extension after landing on said bottom wall, and a slippery coating on the inner peripheral wall of said container for frustrating attempts of the insect to climb said inner peripheral wall; and a moisture-retaining ring of foam-plastic material in one of said compartments.

2. A trap as defined in claim 1, further comprising a cup-shaped receptacle for said bait spaced from said peripheral wall.

3. A trap as defined in claim 2, wherein said bottom part and said lid are provided with mating formations enabling separation of said lid from said bottom part for giving access to said receptacle.

4. A trap as defined in claim 3, wherein said formations include a frustoconical edge on said bottom part and a complementary edge on said lid.

5. A trap as defined in claim 2, wherein said extension comprises a collar depending from said lid above said receptacle.

6. A trap as defined in claim 5, wherein said collar is substantially funnel-shaped.

7. A trap as defined in claim 6, wherein said collar and said aperture have a diameter exceeding that of said receptacle.

8. A trap as defined in claim 1 wherein at least said lid is transparent.

9. A trap as defined in claim 1, wherein said bottom part is provided with a cup-shaped bait receptacle having an upper open end; and a perforated cover overlying said open end.

* * * * *